US008645476B2

(12) United States Patent
Lu et al.

(10) Patent No.: US 8,645,476 B2
(45) Date of Patent: Feb. 4, 2014

(54) METHOD AND APPARATUS FOR COMMAND SYNCHRONIZATION

(75) Inventors: Kecheng Lu, Beijing (CN); Lejun Zhu, Shanghai (CN); Wei Zheng, Beijing (CN); Yanbing Zhu, Shanghai (CN); Jianrong Chen, Shanghai (CN); Yuman Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 786 days.

(21) Appl. No.: 12/513,156

(22) PCT Filed: Nov. 6, 2006

(86) PCT No.: PCT/CN2006/002965
§ 371 (c)(1),
(2), (4) Date: Feb. 18, 2010

(87) PCT Pub. No.: WO2008/055378
PCT Pub. Date: May 15, 2008

(65) Prior Publication Data
US 2010/0145477 A1    Jun. 10, 2010

(51) Int. Cl.
G06F 15/16 (2006.01)
H04J 3/06 (2006.01)

(52) U.S. Cl.
USPC ............................ 709/206; 709/218; 370/503

(58) Field of Classification Search
USPC ................................... 709/218, 206; 370/503
See application file for complete search history.

(56) References Cited

U.S. PATENT DOCUMENTS

| 7,752,296 B2* | 7/2010 | Kim ............................... 709/223 |
| 8,219,692 B2* | 7/2012 | Kim et al. ...................... 709/228 |
| 2003/0163570 A1* | 8/2003 | Hendley et al. ................ 709/227 |
| 2004/0252726 A1* | 12/2004 | Matsumoto ................... 370/503 |
| 2006/0179123 A1* | 8/2006 | Smith ........................... 709/218 |
| 2007/0198698 A1* | 8/2007 | Boyd et al. .................... 709/224 |

FOREIGN PATENT DOCUMENTS

| WO | WO-2004/032515 A1 | 4/2004 |
| WO | 2005/098674 A1 | 10/2005 |
| WO | WO-2008/055378 A1 | 5/2008 |

OTHER PUBLICATIONS

Ellen Moyse, International Preliminary Report on Patentability, Patent Cooperation Treaty, May 12, 2009, 5 pages, PCT/CN2006/02965, The International Bureau of WIPO, Geneva, Switzerland.
Xiaoqian Li, International Search Report and Written Opinion, Patent Cooperation Treaty, Aug. 16, 2007, 10 pages, PCT/CN2006/02965, The State Intellectual Property Office, the P.R. China, Beijing, China.
Binary Remoting Protocol, Sep. 2, 2004, Version 0.9, 17 pages.

(Continued)

Primary Examiner — Asghar Bilgrami
(74) Attorney, Agent, or Firm — Schwabe, Williamson & Wyatt, P.C.

(57) ABSTRACT

Method and apparatus for command synchronization is described. In some embodiments, a remote system system may set up a user interactive session with a local device according to a user interaction protocol. The remote system may insert a predetermined execution time into a first command and send the first command to a local device according to the user interaction protocol. The first command, when executed on the local device, causes a second command compliant with the user interaction protocol to execute on the local device at the predetermined execution time.

18 Claims, 5 Drawing Sheets

(56) References Cited

OTHER PUBLICATIONS

Yajuan Wang, Realization of the Remote User Interface on STB based UPnP protocol, Cable TV Technology, Sep. 30, 2005, 3 pages.
First Office Action for Chinese Patent Application No. 200680056863.4, Mailed Jan. 26, 2011, 11 pages.
Intel Corporation, Extended Device Remote Transfer Protocol (XRT Protocol), Feb. 2005, 30 pages, Version 2.2.
Office Action for EP06805166.3, mailed Nov. 26, 2012, 4 pages.
Supplementary European Search Report for EP06805166.3, mailed Nov. 6, 2012, 3 pages.
Office Action mailed Aug. 30, 2013 for European Application No. 06805166.3, 4 pages.

* cited by examiner

METHOD AND APPARATUS FOR COMMAND SYNCHRONIZATION

CROSS REFERENCE TO RELATED APPLICATION

This patent application is a U.S. National Phase application under 35 U.S.C. §371 of Internatonal Application No. PCT/CN2006/002965, filed on Nov. 6, 2006, entitled METHOD AND APPARATUS FOR COMMAND SYNCHRONIZATION.

BACKGROUND

A remote system running an user interface (UI) application may start a user interactive session with a local device, connecting with the remote system via a network based upon a protocol, such as an extended device remote transfer protocol (XRT protocol). The user interactive session may facilitate interactions between the user of the local device and the UI application of the remote system so that the local device may render content provided by the remote system or other parties to the user. Based upon the XRT protocol, the remote system may send screen bitmaps and control commands to the local device and receive user input and state back from the local device. The local device may execute the control commands immediately after the receipt.

Therefore, for some of the control commands that may need to be executed by the local device at a specific time, the remote system may need to determine a timing to send the control commands so that the local device may receive and execute the command at the right time. Usually, the remote system may continue querying current time from the local device and send the command until the current time at the local device is proximal or equal to the specific time.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes method and apparatus for command synchronization. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or sending information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
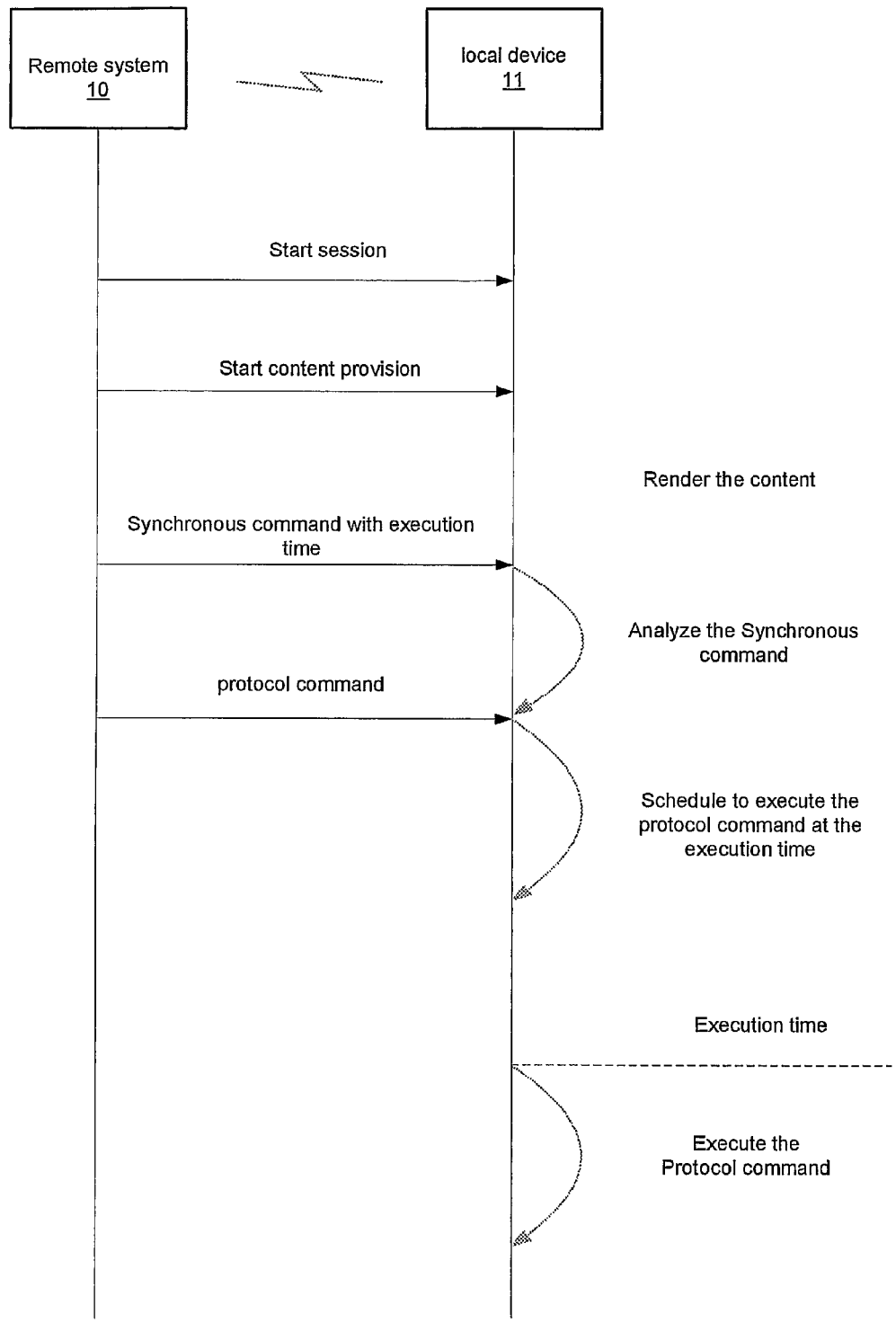
FIG. 1 shows an embodiment of a session between a remote system and a local device.

FIG. 1 shows conceptually a session between a remote system and a local device according to an embodiment of the present invention. As shown, a remote system 10 may connect with a local device 11 through a network such as Ethernet, fiber channel, wireless connection, or possibly other communication links.

The remote system 10 may start a user interactive session with the local device 11 according to a user interaction protocol, such as Extended Device Remote Transfer Protocol (XRT protocol). Examples for the remote system 10 may comprise mainframe computer, mini-computer, personal computer, portable computer, laptop computer and other devices for transceiving and processing data. Examples for the local device 11 may comprise a content processing device coupled to a play unit (e.g., a set-top box coupled to a television), a content processing and playing device including the play unit (e.g., a handheld/mobile media device), and possibly other devices for transceiving and processing data.

During the session, the remote system 10 may receive user input compliant with the user interaction protocol (e.g., XRT protocol) from the local device 11 so that the remote system 10 may interact with the user through the local device 11. The remote system 10 or other parties (e.g., another remote system connecting with the local device 11 through the network) may provide content to the local device 11 according to the user input, so that the local device 11 may render the content to the user by decoding the content and providing the decoded content to the play unit coupled to the local device 11 or encompassed within the local device 11. Examples for the content may comprise multimedia content such as movies, service news and games.

During the session, the remote system 10 may send a protocol command that may need to be executed at a specific execution time during content rendering on the local device 11, wherein the protocol command may comply with the user interaction protocol (e.g., XRT protocol). For example, the remote system 10 may send the protocol command to play a subtitle related to a movie being rendered by the local device at a specific time. Then, the remote system 10 may generate a synchronous command indicating the execution time to execute the protocol command and send the synchronous command to the local device 11 which is immediately followed by the protocol command.

After receiving the synchronous command, the local device 11 may analyze the synchronous command and schedule to execute the followed protocol command at the execution time indicated in the synchronous command, for example, by putting the protocol command in a queue. The local device 11 may monitor current time at the local device 11 and execute the protocol command if the current time is proximal or equal to the execution time.

Other embodiments may implement other technologies for the session as stated above. For example, the synchronous command and associated protocol command may be sent to the local device at any time prior to the execution time (e.g., before providing the content). In another example, the protocol command may be sent a while after the associated synchronous command rather than immediately following the synchronous command. In yet another example, the remote system 10 may send a command different from the protocol command that may also need to be executed at a specific time.

Figure 2:
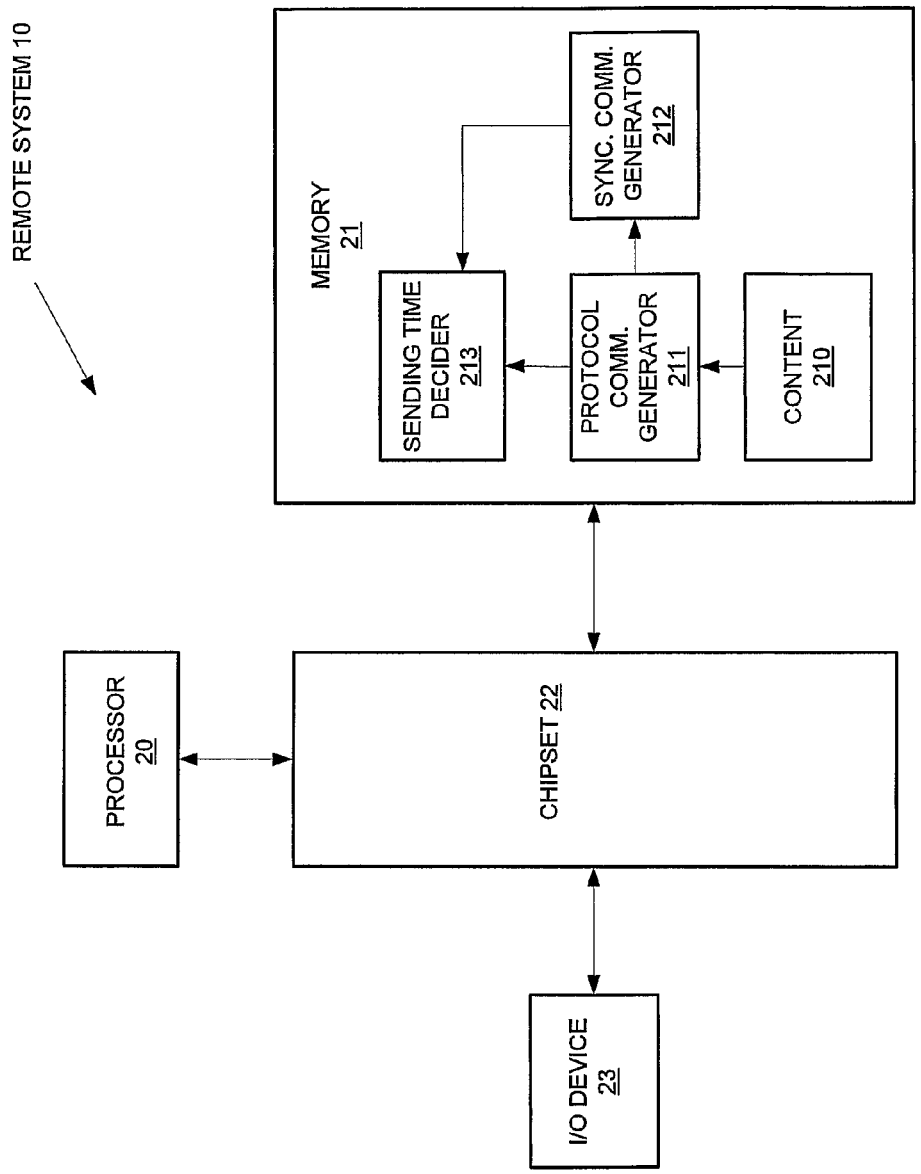
FIG. 2 shows an embodiment of a computing platform implemented as the remote system.

FIG. 2 shows an embodiment of a computing platform implemented as the remote system 10. The remote system 10 as shown in FIG. 2 may comprise one or more processors 20, memory 21, chipset 22, I/O device 23 and possibly other components. The one or more processors 20 are communicatively coupled to various components (e.g., the memory 21) via one or more buses such as a processor bus. The processors 20 may be implemented as an integrated circuit (IC) with one or more processing cores that may execute codes. Examples for the processor 20 may include Intel® Xeon™, Intel® Pentium™, Intel® Itanium™ architectures, available from Intel Corporation of Santa Clara, Calif.

The memory 21 may store codes to be executed by the processor 20. Examples for the memory 21 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

The chipset 22 may provide one or more communicative path among the processor 20, the memory 21, the I/O device 23 and possibly other components. The chipset 22 may further comprise hubs to respectively communicate with the processor 20, the memory 21 and the I/O device 23. For example, the chipset 22 may comprise a memory controller hub, an input/output controller hub and possibly other hubs.

The I/O devices 23 may input or output data to or from the remote system 10, such as content and command. Examples for the I/O devices 23 may comprise a network card, a bluetooth, an antenna, and possibly other devices for transceiving data.

In the embodiment as shown in FIG. 2, the memory 21 may further comprise codes implemented as a content 210, a protocol command generator 211, a synchronous command generator 212, a sending time decider 213 and possibly other logics.

The content 210 may generate content to be rendered by the local device 11 during the session. However, it should be appreciated that the content 210 may be provided in other ways. For example, the content may be provided by a party different from the remote system 10 (e.g., another remote system connecting with the local device 11 through the network), and the remote system may provide the local device 11 with a hyperlink for the content.

The protocol command generator 211 may generate a protocol command complying with the user interaction protocol in response that such protocol command is needed during the session. Some of the protocol command may be related to the content 210 rendered on the local device 11, and therefore the protocol command generator 211 may generate the protocol command based upon the content 210. For example, the protocol command may be a command to display a subtitle for a movie being rendered on the local device and the protocol command may comprise the subtitle or a link for the subtitle. In another example, the protocol command may be a command to play an advertisement when the local device is rendering news and the protocol command may comprise the advertisement or a link for the advertisement. However, some of the protocol command may be irrelevant to the content 210, and therefore the protocol command generator 211 may generate the protocol command independently.

As stated above with reference to FIG. 1, some of the protocol commands may need to be executed at the specific execution time (e.g., a command to play an advertisement once every other hour), while some may not. For those protocol command sensitive to the execution time, the synchronous command generator 212 may generate a synchronous command indicating the execution time for the protocol command. The synchronous command may have various patterns. The following pattern may be one of them:

First 2 bytes command length
    Next 2 bytes command identifier
    Next 2 bytes synchronization type
    Next x bytes synchronization data According to the above pattern, the first 2 bytes may indicate command length of the synchronization command. The next 2 bytes may be an identifier to identify the synchronization command, such a serial number to identify the synchronization command according to the session protocol. The next 2 bytes may be an indicator to indicate a synchronization type. Examples for the synchronization type may comprise universal time in millisecond (or other time units) that may indicate to execute the protocol command at n millisecond universal time, elapsed time in millisecond (or other time units) that may indicate to execute the protocol command when n millisecond elapses since rendering content by the local device, position in frame number that may indicate to execute the protocol command at $n^{th}$ frame of the content rendered by the local device 11, and possibly other synchronization types. The next x bytes may comprise the synchronization data, such as the data n in the above examples, wherein the number x may be defined according to different synchronization type.

It should be appreciated that the synchronization command may take other patterns. For example, the command length may be omitted if the synchronization command is in a fixed length according to the session protocol. In another example, the synchronization command may further comprise an indicator to indicate the associated protocol command, for example, to indicate the position of the protocol command. Such arrangement may be useful for the case that the protocol command may not immediately follow the synchronous command, but may be away from the synchronous command, e.g., for several other commands.

The sending time decider 213 may determine a time to send the synchronous command and the associated protocol command. For example, the synchronous command and the protocol command may be sent to the local device at any time prior to the execution time, e.g., before sending the content to the local device 11. In another example, the synchronous command and the protocol command may be sent at a time close to the execution time so that the local device 11 may still execute the protocol command at a right time even though the local device 11 may not be able to recognize and execute the synchronous command. Further, the protocol command may be sent immediately following the synchronous command or a while after the synchronous command.

In certain situations the local device 11 may be unable to execute the synchronous command. For example, the synchronous command may be unrecognizable to the local device 11, or the synchronous type indicated in the synchronous command may be unexecutable, or possibly other reasons. Therefore, the sending time device 213 may further determine to send a next protocol command at a time proximal or equal to its execution time by continuing querying current time from the local device 11.

Other embodiments may implement other technologies for the structure of the remote system 10. For example, the synchronous type indicated by the synchronous command may be different for different protocol commands. In another example, the synchronous command generator 212 may change the synchronous type if being notified that the local device 11 is unable to execute a previous synchronous command. In yet another example, the synchronous command generate 212 may generate synchronous command for a command different from the protocol command that may also need to be executed at a specific time.

Figure 3:
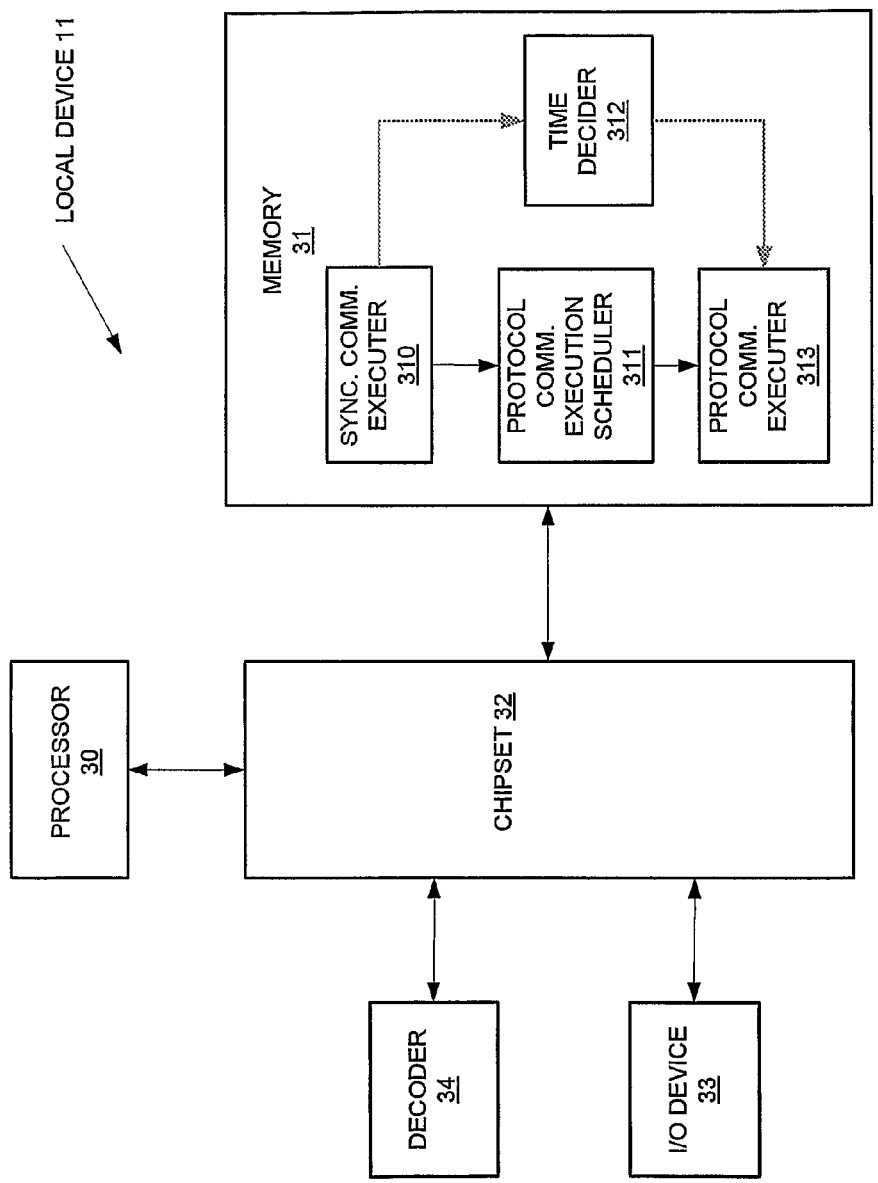
FIG. 3 shows an embodiment of another computing platform implemented as the local device.

FIG. 3 shows an embodiment of another computing platform implemented as the local device 11. As shown, the local device 11 may comprise one or more processors 30, a memory 31, a chipset 32, an I/O device 33, a decoder 34 and possibly other components. The one or more processors 30 are communicatively coupled to various components (e.g., the memory 31) via one or more buses such as a processor bus. The processors 30 may be implemented as an integrated circuit (IC) with one or more processing cores that may execute codes. Examples for the processor 30 may include Intel® Core™ Duo, available from Intel Corporation of Santa Clara, Calif.

The memory 31 may store codes to be executed by the processor 30. Examples for the memory 31 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

The chip set 32 may provide one or more communicative path among the processor 30, the memory 31, the I/O device 33, the decoder 34 and possibly other components. The chip set 32 may further comprise hubs to respectively communicate with the processor 30, the memory 31, the I/O device 33 and the decoder 34. For example, the chipset 32 may comprise a memory controller hub, an input/output controller hub and possibly other hubs.

The I/O devices 33 may input or output data to or from the local device 11.1 For example, the I/O device 33 may input content and command from the remote system 10 and output device feedback and user input to the remote system 10. Examples for the I/O devices 23 may comprise network card, a blue-tooth, an antenna, and possibly other devices for transceiving data. In another example, the I/O devices 23 may further comprise a play unit (e.g., audio device and video device) to play the content for the user.

The decoder 34 may decode the content received from the remote system 10 so that the play unit may play the decoded content to the user.

In the embodiment as shown in FIG. 3, the memory 31 may further comprise codes implemented as a synchronous command executer 310, a protocol command execution scheduler 311, a time decider 312, a protocol command executer 313 and possibly other logics.

The synchronous command executer 310 may determine whether the synchronous command is executable. It is possible that the synchronous command from the remote system 10 may be unexecutable for various reasons, e.g., the synchronization type indicated in the synchronous command is unexecutable.

In response to determining that the synchronous command is executable, the synchronous command executer 310 may execute the synchronous command by instructing the protocol command execution scheduler 311 and the protocol command executer 313 to schedule and execute the protocol command associated with the synchronous command at the execution time in the synchronous command. Therefore, the synchronous command executer 310 may further determine the execution time in the synchronous command. The execution time may be presented by the predetermined elapsed time since rendering content by the local device 11, by the predetermined universal time, by the predetermined frame number of the content rendered by the local device 11, or possibly by other ways.

However, it should be appreciate that the synchronous command executer 310 may execute the synchronous command for other aspects. For example, the synchronous command generator 310 may further determine the protocol command associated with the synchronous command through, e.g., the protocol command position in the synchronous command. In another example, the synchronous command generator 310 may default each synchronous command from the remote system 10 is executable and determine the execution time directly.

The protocol command execution scheduler 311 may schedule execution of the protocol command according to the execution time in the synchronous command. For example, the command execution scheduler 311 may put the protocol command in a waiting list and defer executing the protocol command until the execution time arrives.

The time decider 312 may determine current time at the local device 11. In the case that the execution time is represented by the predetermined elapsed time or predetermined universal time, the time decider 312 may check current elapsed time or current universal time. In the case that the execution time is represented by the predetermined frame number, the time decider 312 may check a current frame number of the content being rendered on the local device 11. If the local device 11 is unable to execute the synchronous command, the time decider 312 may further provide current time at the local device 11 upon being requested from the remote system 10, on which basis the remote system 10 may determine the sending time to send a next protocol command.

The protocol command executer 313 may execute the protocol command if the current time at the local device is proximal or equal to the execution time. For example, the command executer 313 may execute the protocol command if the current elapsed time or current universal time is proximal or equal to the predetermined ones. In another example, the command executer 313 may execute the protocol command if the local device is rendering the predetermined frame number of the content.

Other embodiment may implement other technologies for the structure of the local device 11. For example, the I/O device 33 may send a notification to the remote system 10 if the synchronous command is unexecutable. In another example, the protocol command execution scheduler 311 and the protocol command executer 313 may schedule and execute a command different from the protocol command at a predetermined execution time. Further, the protocol command executer 313 may execute the command upon receiving the command rather than waiting until the execution time if the associated synchronous command is unexecutable.

Figure 4:
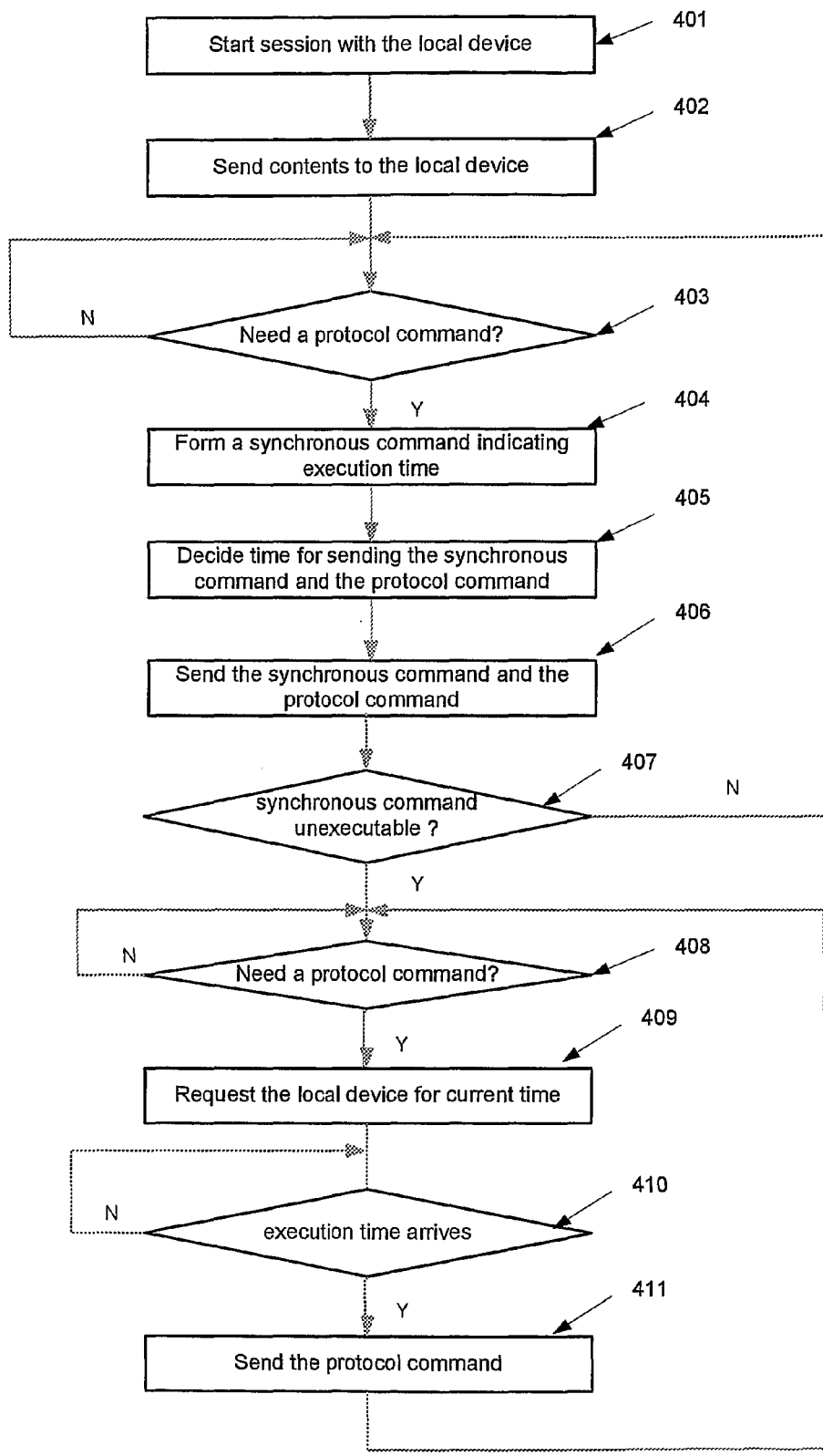
FIG. 4 shows an embodiment of a method of command provision by the remote system.

FIG. 4 shows an embodiment of a method of command provision by the remote system 10. In block 401, the remote system 10 may start a user interactive session with the local device 11 based upon a session protocol, such as XRT protocol, and in block 402, the remote system 10 may start sending content to the local device 11 to be rendered to a user and receive user input from the local device 11.

In block 403, the remote system 10 may determine to send the local device 11 a protocol command that may need to be executed at a specific execution time. Then, in block 404, the remote system 10 may generate a synchronous command in various patterns, wherein the synchronous command may indicate the execution time to execute the protocol command. The execution time may be represented in various ways, such as an elapsed time since rending the content by the local device 11, a universal time, or a frame number of the content rendered by the local device 11.

If the protocol command is sent immediately after the synchronous command, the remote system 10 may determine the sending time to send the synchronous command in block 405. If the protocol command is sent a while after the synchronous command, the remote system 10 may further determine the sending time to send the protocol command. The remote system 10 may determine to send the synchronous command and protocol command at any time prior to the execution timing. Alternatively, the remote system 10 may determine to send the synchronous command and protocol command shortly before the execution time so that the local device 11 may still execute the protocol command at a right time even though the local device 11 is unable to execute the synchronous command immediately.

In block 406, the remote system 10 may send the synchronous command and protocol command at the sending time. Then, in block 407, the remote system 10 may determine whether to receive a notification to notify that the synchronous command is unexecutable by the local device 11. In response to determining that the local device 11 is unable to execute the synchronous command and more protocol commands need to be sent to the local device 11 (block 408), the remote system 10 may send a next protocol command at a time proximal or equal to its execution time by requesting the local device 11 for the current time (block 409), determining whether the current time at the local device 11 is proximal or equal to the execution time (block 410) and send the protocol command if the current time is proximal or equal to the execution time (block 411).

Other embodiments may implement other technologies for the method of command provision by the remote system 10. For example, the remote system 10 may adopt the method of FIG. 4 when determining to send a command different from the protocol command that may also need to be executed at a particular time. In another example, the remote system 10 may change the pattern of the synchronous command (e.g., change the synchronization type) for the next protocol command if being notified that the previous synchronous command is unexecutable at the local device.

Figure 5:
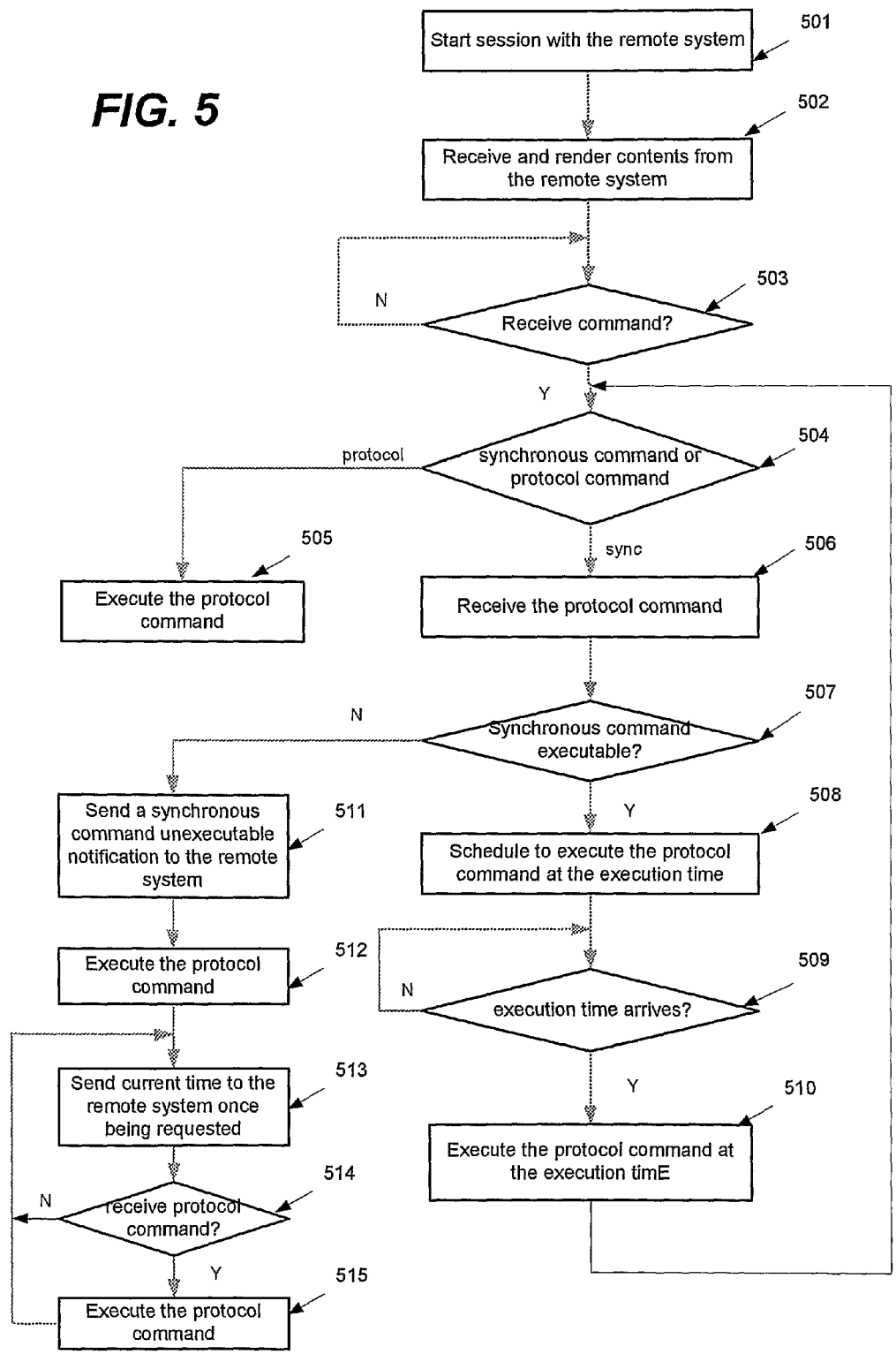
FIG. 5 shows an embodiment of a method of command execution by the local device.

FIG. 5 shows an embodiment of a method of command execution by the local device 11. In block 501, the local device 11 may start a user interactive session with remote system 10. In block 502, the local device 11 may start rendering content received from the remote system 10. Then, the local device 11 may determine whether receiving a command from the remote system 10 (block 503), and whether the received command is a protocol command or a synchronous command (block 504). In response to the protocol command, the local device 11 may execute the protocol command in block 505. Such situation may happen if the protocol command does not need to be executed at a particular time.

In response to the synchronous command, the local device 11 may wait until receiving the protocol command associated to the synchronous command. For example, the protocol command may immediately follow the synchronous command. In another example, the protocol command may follow the synchronous command after several commands or content.

In block 507, the local device 11 may determine whether the synchronous command is executable, for example, whether the synchronous type indicated by the synchronous command is executable. If executable, the local device 11 may schedule to execute of the protocol command at the execution time indicated by the synchronous command (block 508). For example, the local device 11 may put the protocol command in a waiting list until the execution time arrives. Then, the local device 11 may determine whether the execution time arrives by, for example, checking whether the current time at the local device 11 is proximal or equal to the execution time (block 509), and execute the protocol command at the execution time if the execution time arrives (block 510).

In response to determining that synchronous command is unexecutable in block 507, the local device 11 may send a notification to the remote system 10 to notify that the received synchronous command is unexecutable in block 511. In block 512, the local device 11 may execute the protocol command received at block 506. In block 513, the local device 11 may send a current time at the local device to the remote system 10 once being requested. Then, the local device 11 may determine if receiving a new protocol command (block 514) and execute the new protocol command upon the receipt (block 515).

Other embodiments may implement other technologies for the method of command execution by the local device 11. For example, the local device may apply the method of FIG. 5 for commands different from the protocol command that may also need to be executed at a particular time. For another example, the local device 11 may not send a notification if the synchronous command is unexecutable, but execute the protocol command once finding the synchronous command is unexecutable.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method of operating a system, comprising:
   establishing, by the system, a user interactive session with a device;
   sending, by the system, a first command and a second command, following the first command, to the device for execution, wherein the first command includes a time the second command is to be executed by the device, and wherein execution of the first command, by the device, causes the second command to be scheduled for execution on the device at the time specified in the first command, wherein the system is remotely disposed from the device and the time specified in the first command is indicated in terms of a content frame being rendered by the device.

2. The method of claim 1, wherein the first command is a synchronous command and the second command is compliant with a user interaction protocol.

3. The method of claim 1, further comprising: sending, by the system, the second command to the device, at a time different from the sending of the first command.

4. The method of claim 2, wherein the user interaction protocol is an extended device remote transfer (XRT) protocol.

5. The method of claim 1, further comprising:
receiving a notification from the device that the first command is unexecutable;
determining a different command executable by the device; and
sending the different command to the device to be executed, wherein the different command, when executed by the device is to cause the second command to execute at the time specified in the first command.

6. The method of claim 1, wherein the first command further indicates a position of the second command.

7. The method of claim 1, further comprising:
receiving a notification from the device to notify that the first command is unexecutable on the device;
determining an execution time for the device to execute a third command;
determining whether a current time at the device is proximal or equal to the execution time; and
sending the third command to the device if the current time at the device is proximal to the execution time.

8. The method of claim 7, further comprising:
continuously requesting the current time from the device until the current time is proximal, or equal, to the execution time.

9. A method of operating a device, comprising:
establishing, by the device, a user interactive session with a system;
receiving, by the device, a first command and a second command, following the first command, from the system, wherein the first command includes a time the second command is to be executed by the device; and
executing, by the device, the first command, when the first command is executable, which causes the second command to be scheduled for execution on the device at the time specified in the first command, wherein the system is remotely disposed from the device and the time specified in the first command is indicated in terms of
a content frame being rendered by the device.

10. The method of claim 9, further comprising receiving, by the device, the second command from the system, at a time different from the receiving of the first command.

11. The method of claim 9, wherein the first command is a synchronous command and the second command is compliant with a user interaction protocol.

12. The method of claim 11, wherein the user interaction protocol is an extended device remote transfer (XRT) protocol.

13. The method of claim 9, wherein the first command further comprises a position of the second command.

14. The method of claim 9, further comprising, when the first command is unexecutable by the device, immediately executing the second command.

15. The method of claim 9, further comprising:
determining, by the device, that the first command is unexecutable,
sending, by the device, a notification to the system to notify that the first command is unexecutable; and
sending, by the device, a current time of the device to the system upon a request from the system.

16. The method of claim 9, further comprising:
in response to a determination that the first command is unexecutable, receiving a third command from the system; executing the third command immediately after the receipt of the third command.

17. A system comprising:
a transceiver; and
a command module, coupled with the transceiver, configured to:
establish a user interactive session with a device; and
send a first command and a second command, following the first command, to the device for execution, wherein the first command includes a time the second command is to be executed by the device, and wherein execution of the first command, by the device, causes the second command to be scheduled for execution on the device at the time specified in the first command, wherein the system is remotely disposed from the device and the time specified in the first command is indicated in terms of
a time that elapses after rendering of a content frame by the device.

18. At least one non-transitory computer-readable storage medium comprising instructions, which, when executed by a processor configure a device to:
establish a user interactive session with a system;
receive a first command and a second command, following the first command, from the system, wherein the first command includes a time the second command is to be executed;
execute the first command, when the first command is executable, wherein execution of the first command causes the second command to be scheduled for execution on the device at the time specified in the first command; wherein the system is remotely disposed from the device and the time specified in the first command is indicated in terms of
a predetermined universal time.

* * * * *